(12) United States Patent
Liao

(10) Patent No.: US 6,463,401 B1
(45) Date of Patent: Oct. 8, 2002

(54) OPERATING/CONTROLLING DEVICE FOR COMPUTER GAME

(76) Inventor: Chu-Yuan Liao, 5F-1, No. 177, Sec. 1 Ho-Ping E. Rd., Taipei (TW)

( * ) Notice: Subject to any disclaimer, the term of this patent is extended or adjusted under 35 U.S.C. 154(b) by 0 days.

(21) Appl. No.: 09/309,784

(22) Filed: May 12, 1999

(51) Int. Cl.[7] ................................................. G01L 5/16
(52) U.S. Cl. .............................. 703/1; 73/628; 73/652; 703/7
(58) Field of Search ........................... 703/1, 7; 73/262, 73/628, 652, 862

(56) References Cited

U.S. PATENT DOCUMENTS 5,604,314 A * 2/1997 Grahn ........................... 73/628
6,024,576 A * 2/2000 Bevirt et al. .................. 434/262
RE37,065 E * 2/2001 Grahn ........................... 73/628

* cited by examiner

Primary Examiner—Hugh M. Jones
Assistant Examiner—Thai Phan
(74) Attorney, Agent, or Firm—Troxell Law Office PLLC

(57) ABSTRACT

An operating/controlling device for computer game, including a soft outer wrapping layer, an inner wrapping layer and a signal controlling device sealedly enclosed by the inner wrapping layer. The signal controlling device includes at least one depression member adjacent to the inner wall of the inner wrapping layer. When depressed, the depression member activates an internal signal sensing member to count different data produced during operation of the depression member and input the data to computer software for providing different operational references for the execution software. The operating/controlling device serves to provide a real and live controlling touch feeling for an operator.

9 Claims, 2 Drawing Sheets

OPERATING/CONTROLLING DEVICE FOR COMPUTER GAME

BACKGROUND OF THE INVENTION

The present invention relates to an improved operating/controlling device for computer game, which includes a soft outer wrapping layer, an inner wrapping layer and a signal controlling device sealedly enclosed by the inner wrapping layer. The operating/controlling device serves to provide a realer controlling touch feeling for an operator.

An operating/controlling device of computer game is able to inter-actively and lively control the characters or development in the computer game. However, such operating/controlling device is often equipped on a large-sized electronic game or some specific computer games and is quite expensive. In a general computer game, a mouse or some keys are used as the operating/controlling device for conducting the characters in the game to move, talk or fight. A sound and light effect is provided to achieve an entertaining effect for the operator. However, such operating/controlling device fails to provide a realer controlling touch feeling for the operator so that the entertaining effect is still quite limited.

SUMMARY OF THE INVENTION

It is therefore a primary object of the present invention to provide an improved operating/controlling device for computer game, including a soft outer wrapping layer, an inner wrapping layer and a signal controlling device sealedly enclosed by the inner wrapping layer. A soft medium can be filled between the inner and outer wrapping layers. The signal controlling device includes at least one depression member adjacent to the inner wall of the inner wrapping layer. When depressed, the depression member activates an internal signal sensing member to count different data produced during operation of the depression member and input the data to computer software for providing different operational references for the execution software. Different execution results are correspondingly shown by an output device such as a display. The operating/controlling device serves to provide a real and live controlling touch feeling for an operator so as to eliminate the shortcoming of unreal operation feeling existing in the conventional device.

The present invention can be best understood through the following description and accompanying drawings wherein:

DETAILED DESCRIPTION OF THE PREFERRED EMBODIMENTS

Figure 1:
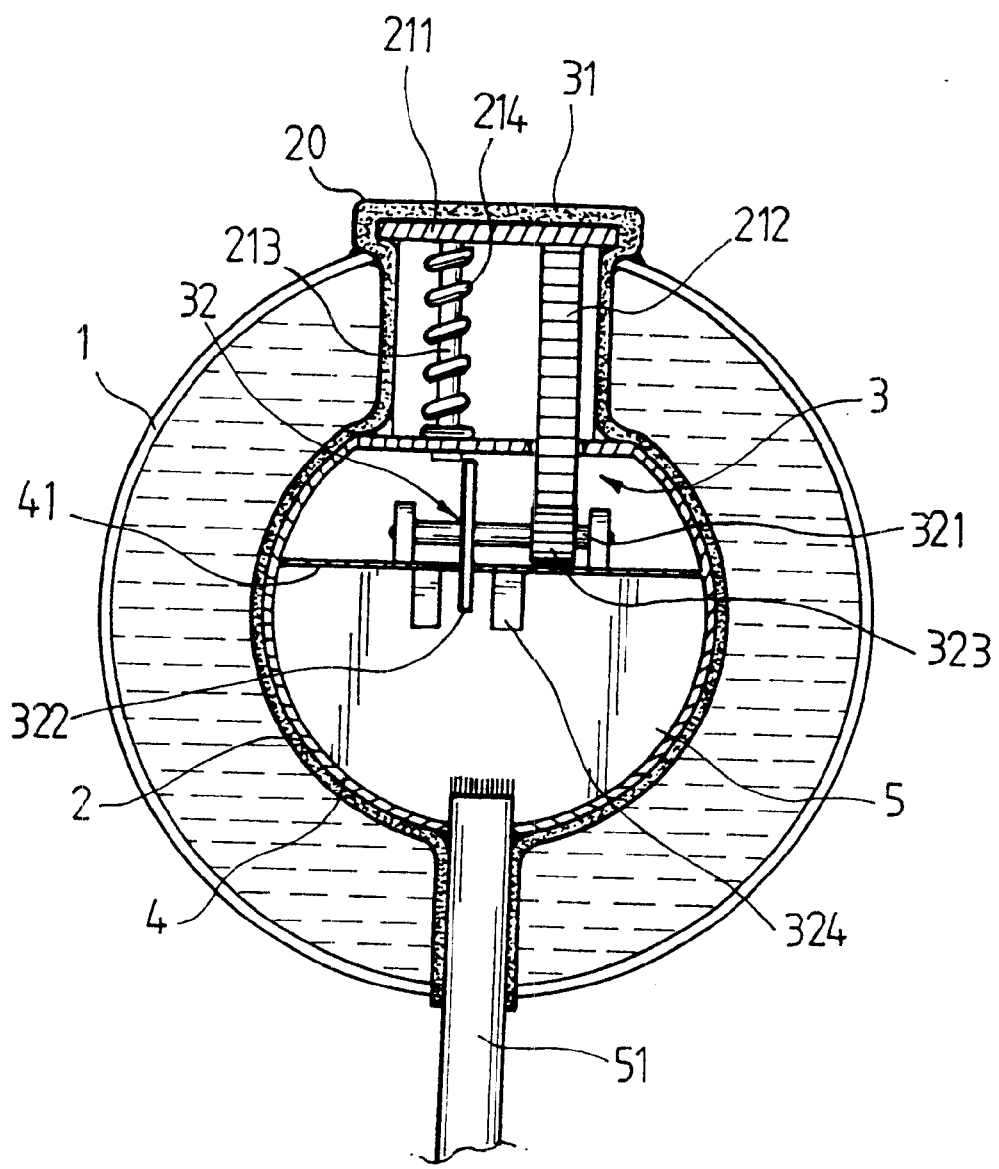
FIG. 1 is a plane sectional assembled view of the present invention.
Figure 2:
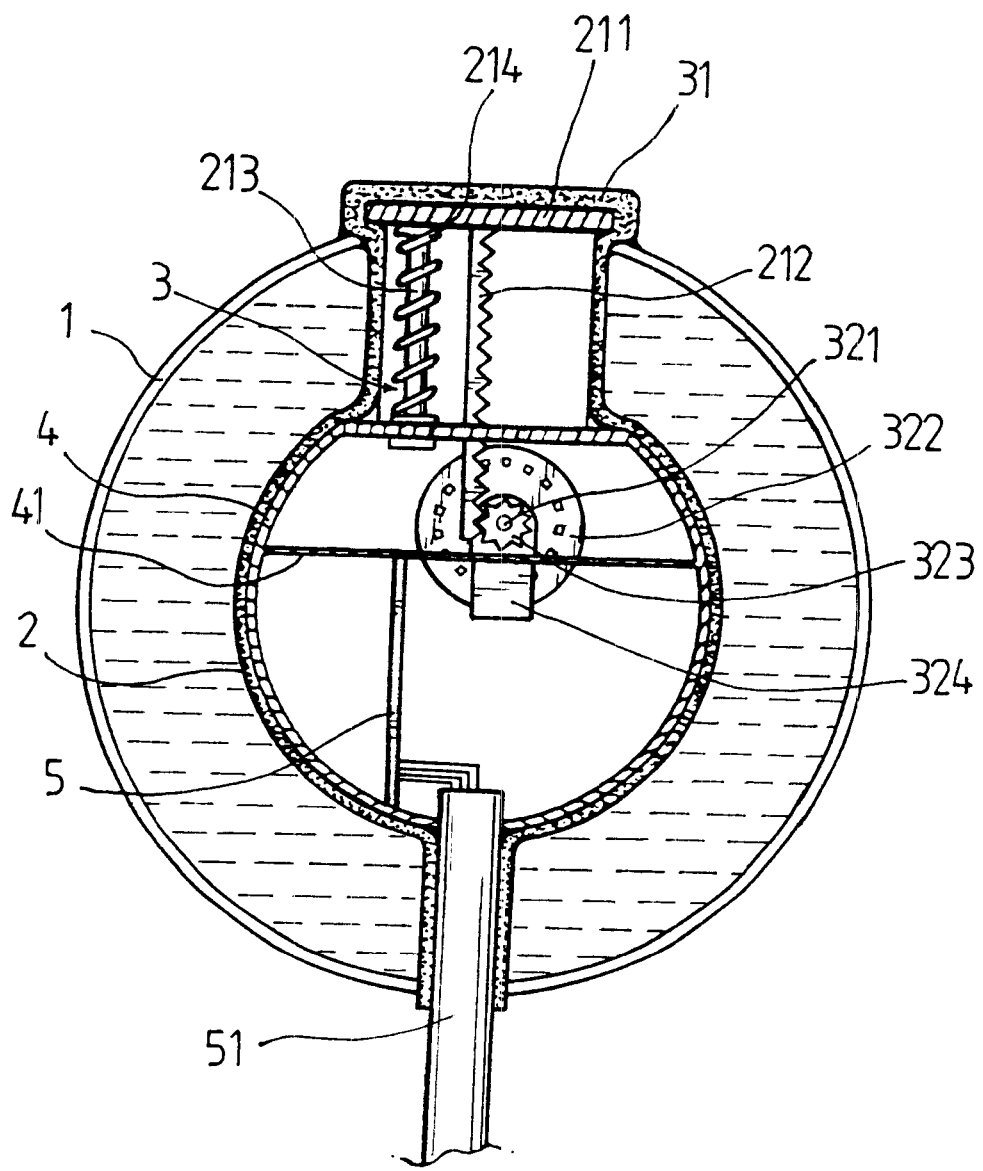
FIG. 2 is a plane sectional assembled view of the present invention seen from another side.

Please refer to FIGS. 1 and 2. The present invention includes an outer wrapping layer 1 made of soft material, an inner wrapping layer 2 and a signal controlling device 3 sealedly enclosed by the inner wrapping layer 2. A soft medium is filled between the outer and inner wrapping layers 1 and 2. The signal controlling device 3 installed in the inner wrapping layer 2 includes at least one depression member 31 adjacent to the inner wall of the inner wrapping layer 2. When depressed, the depression member 31 activates an internal signal sensing member 32 to count different data produced during operation of the depression member 31 and input the data to computer software for providing different operational execution references for the execution software to correspondingly produce different execution results. The results can be really disclosed by a suitable display device. The above assembler device serves as a controlling device specifically applicable to the computer game. By means of the soft medium filled between the inner and outer wrapping layers of the controlling device, a real and live controlling touch feeling is provided for an operator.

According to a preferred embodiment of the present invention, a hard plastic material-made spherical protective shade 4 with a plainly cut top end is partitioned into an upper and a lower portions by a partitioning board 41. The partitioning board 41 is disposed with a fixing seat for a wheel shaft 321 to mount thereon. A predetermined section of the shaft body of the wheel shaft 321 is disposed with an optically coupled contact wheel 322 and a coaxial driving gear 323. The circumference of the optically coupled contact wheel 322 is arranged with a number of rectangular holes. The partitioning board 41 is formed with a slot corresponding to the optically coupled contact wheel 322, through which the contact wheel 322 can downward extend to lower side of the partitioning board 41. Two sides of the downward extending section of the contact wheel 322 are disposed with an optical coupler 324 at a predetermined position. A downward extending circuit board 5 is disposed along the partitioning board 41 near the optical coupler 324 and connected with a power wire 51 outward passing through the protective shade 4. The protective shade 4 is coated by an emulsion-made inner wrapping layer 2 (which can be an isolating membrane). The inner wrapping layer 2 has a depression section 20 upward extending from the plainly cut top end of the protective shade 4. A receiving space is defined between the depression section 20 and the top end of the protective shade 4. A depression member 211 is enclosed in the depression section 20. The depression member 211 has a downward extending rack 212 and retaining post 213. A resilient member 214 is fitted around the retaining post 213, whereby when depressing the depression member 211, the resilient member 214 serves to provide an upward resilient restoring force. The top end of the protective shade 4 and the partitioning board 41 are formed with through holes corresponding to the rack 212 and the retaining post 213. The rack 212 is engaged with the driving gear 323, whereby when the depression member 211 is depressed, the driving gear 323 is driven to rotate, making the coaxial optically coupled contact wheel 322 rotate.

A spherical emulsion-made squeezing membrane is sealed connected with outer side of the isolating member 2. A thick liquid with high thickness can be filled between the squeezing membrane and the isolating membrane. The above components are assembled to form the operating and controlling device of computer game.

When playing the computer game, the operator can depress the depression member to make the rack drive the gear to rotate. Consequently, the coaxial optically coupled contact wheel is rotated, whereby the rectangular holes of the circumference of the wheel body sequentially pass through the optical coupler which receives the light and generates signals to the circuit board. The circuit board then works to produce simulative inter-active operation and control with the characters and rolls in the computer game content. When the operator continuously depresses and squeezes the controlling device, the rolls in the computer game are correspondingly enlarged or transformed. Therefore, the operating and controlling device is able to provide a real and live controlling touch feeling for the operator.

In addition, the outer wrapping layer of the present invention can be designed as a spherical body with thorny skin (not shown) for achieving a better controlling touch feeling.

The above embodiments are only used to illustrate the present invention, not intended to limit the scope thereof. Many modifications of the above embodiments can be made without departing from the spirit of the present invention.

What is claimed is:

1. An operating/controlling device comprising:
   a) an outer, spherical wrapping layer;
   b) an inner, generally spherical protective member located within the outer wrapping layer, the inner protective member having a partition therein;
   c) a soft medium filled between the outer wrapping layer and the inner protective member;
   d) an optical coupler located on the partition board within the inner protective member;
   e) an optical contact wheel mounted on the partition board adjacent to the optical coupler;
   f) a gear coupled to the optical contact wheel;
   g) a circuit board mounted within the inner protective member and connected to a power wire passing through the outer wrapping layer and the inner protective member;
   h) a depression member manually movable relative to the inner protective member from externally of the outer wrapper layer; and,
   i) a rack extending from the depression member and engaging the gear whereby movement of the depression member causes movement of the optical control wheel.

2. The operating/controlling device of claim 1 further comprising a biasing device acting between the inner protective member and the depression member to bias the depression member toward an initial position.

3. The operating/controlling device of claim 2 wherein the biasing device comprises a resilient member fitted around a retaining post extending from the depression member.

4. The operating/controlling device of claim 2 wherein the optical contact wheel has a plurality of holes therethrough.

5. The operating/controlling device of claim 1 wherein the optical contact wheel extends through a slot in the partition.

6. The operating/controlling device of claim 5 further comprising a wheel shaft having the optical contact wheel and the gear thereon, the wheel shaft mounted on a first side of the partition, wherein the optical coupler is mounted on a second side of the partition opposite to the first side.

7. The operating/controlling device of claim 1 further comprising an inner wrapping layer enclosing the inner protective member and the depression member.

8. The operating/controlling device of claim 1 wherein the soft medium comprises a liquid.

9. The operating/controlling device of claim 1 wherein the outer wrapping layer comprises a squeezing membrane.

* * * * *